Jan. 11, 1966  G. H. ROHRBACK  3,228,799
BIOLOGICAL ELECTRICAL POWER GENERATION
Filed Aug. 1, 1960  5 Sheets-Sheet 1

Inventor
GILSON H. ROHRBACK

Jan. 11, 1966 G. H. ROHRBACK 3,228,799
BIOLOGICAL ELECTRICAL POWER GENERATION
Filed Aug. 1, 1960 5 Sheets-Sheet 3

Inventor
GILSON H. ROHRBACK

Jan. 11, 1966  G. H. ROHRBACK  3,228,799
BIOLOGICAL ELECTRICAL POWER GENERATION
Filed Aug. 1, 1960  5 Sheets-Sheet 4

Inventor
GILSON H. ROHRBACK

United States Patent Office

3,228,799
Patented Jan. 11, 1966

3,228,799
BIOLOGICAL ELECTRICAL POWER GENERATION
Gilson H. Rohrback, Whittier, Calif., assignor, by mesne assignments, to TRW Inc., a corporation of Ohio
Filed Aug. 1, 1960, Ser. No. 46,404
28 Claims. (Cl. 136—100)

This invention relates to power packages or electrical energy generators using biological processes of living organisms for generating electric current. Specifically this invention relates to primary "sea" batteries or chemically reacting electric energy generators which use ordinary sea water as an electrolyte and biological processes to promote the chemical reactions for current generation.

Heretofore known primary batteries or devices for generating electricity by chemical action have required a pair of electrodes forming a couple and composed of materials having different electromotive forces immersed in an electrolyte. The electrode, higher in the electromotive force series, formed the positive electrode or anode and was consumed by reaction with the electrolyte. The other electrode lower in the electromotive force series, formed the negative electrode or cathode. In such devices when the two electrodes are coupled by a conductor outside the electrolyte, current flows in the electrolyte from the anode to the cathode while outside of the battery, of course, the current flows in the reverse direction from the cathode to the anode through the conductor.

In all systems for electro-chemical generation of power, two distinct electrode processes occur. The first process is anodic in which a substance is oxidized and gives up electrons to an electrode. The second process is cathodic in which electrons are consumed by a substance which is reduced. A general equation can be written to represent both of these half cell processes as follows:

$$\text{Reduced state} \underset{\text{cathodic}}{\overset{\text{anodic}}{\rightleftarrows}} \text{oxidized state} + ne \quad (1)$$

where the symbol $ne$ represents a definite number of electrons given off or consumed for each distinct molecular species of the reduced or oxidized state.

Even though the directions of the above half cell reactions are opposite for the anodic and cathodic process, the electrode potential $E$ for both is given by the same equation:

$$E = E° + \frac{RT}{nF} \ln \frac{(\text{OXID})}{\text{RED}} \quad (2)$$

The + sign in the above equation follows the convention in which substances more oxidizing than hydrogen are assigned a positive potential. In the equation $E°$ is the standard potential relative to the hydrogen electrode of the electrode reaction; $R$ and $F$ are constants; $T$ is the absolute temperature; $n$ is the number of electrons involved; (OXID) represents the product of the concentration of all of the substances on the oxidized side of Equation 1 and (RED) represents the product of all of the substances on the reduced side of Equation 1.

It has now been found that biological processes of living organism growing in intimate contact with electrodes can markedly promote the above equations. These biological processes of living organism may produce enzymes which catalyze both molecular and half cell reactions.

According to this invention these living organisms or their enzymes or both are utilized to depolarize the half cell reactions or to directly catalyze the half cell reactions.

Equation 2 shows that the potential of any given electrode reaction is dependent upon the nature of the substances involved (represented by $E°$) and on the concentration of the substances at the electrode surface. Thus if two different electrodes in a common electrolyte are coupled by an external electric conductor, the more anodic electrode potential will show a negative potential to an external volt meter and electrons will flow from that electrode to the other in an attempt to reduce the potential difference. The equation represents the potential of an electrode which is not supporting a flow of current. When it is coupled to another electrode having a different potential and in the same electrolyte, the subsequent current flow causes the potential of both electrodes to charge in a direction approaching each other. This charge in electrode potential with current drain is caused primarily by the change in concentration of the reacting substances at the electrode surface. Thus as shown in the equation the electrode functioning as an anode will be consuming the reduced substance so as to decrease the (RED) concentration and it will be producing the oxidation substance so as to be increasing the (OXID) concentration. The opposite condition will exist at the electrode functioning as the cathode.

Thus the anodic electrode charges in a positive direction or becomes more cathodic and the cathodic electrode charges in a negative direction and becomes more anodic.

This phenomena of potential charge with current drain caused by depletion or buildup of the reaction substances is called "polarization."

Within the scope of this invention any process which furnishes the reaction substance that is being consumed at the electrode (whether it is an oxidized or a reduced species) or removes that substance which is being produced at that electrode is called a "depolarizer." Thus an effective depolarizer will increase the current carrying capacity of an electro-chemical cell and may make power generation possible where it would otherwise not occur.

It has now been found that living organisms can be caused to grow in intimate contact with electrodes in electrolytes that are compatible with the organisms. These organisms derive energy for their life process from a specific oxidation-reduction recation and are selected, in accordance with this invention, to produce the chemical substance which is being used in electrode reaction or to consume an undesirable substance that is being produced. The living organisms thus becomes depolarizers to influence large numbers of electrode reactions. Some organisms liberate hydrogen in their normal life process while others consume hydrogen in order to exist. Still other organisms liberate or consume oxygen, sulfur compounds, carbon compounds, nitrogen compounds, and the like. Since all of the elements or compounds are involved in oxidation-reduction electrode reactions, different couples of these electrode reactions can be promoted by the proper selection of living organisms growing in the vicinity of one or both of the electrodes.

As a specific example of depolarization consider those classes of batteries where hydrogen is liberated at the cathode by the chemical reactions involved and creates a reverse electromotive force opposing main current flow to polarize the battery and rapidly decrease its current producing capacity. To remove this hydrogen, chemical depolarizers have been included in the battery. Depolarizers include oxidizing agents such as nitric acid, chromic acid, manganese dioxide, ferric chloride, and the like. These chemical depolarizers like the anode are also consumed in the operation of the battery and introduce complicating chemical reactions which may lessen the current producing capacity of this battery.

The present invention now eliminates the necessity for this consumable type of chemical depolarizer, makes possible the use of electrodes having the same or very similar electromotive forces, even makes possible the use of non-consumable anodes, and makes practical use of sea water as an electrolyte.

According to this invention, living organisms are used to prevent polarization in batteries or chemical type electrical energy generators and if desired to even create differential electromotive forces at the electrodes. These living organisms may thrive in the electrolyte to build up in strength and capacity as the battery or generator is used or may produce enzymes which are effective to carry out the depolarizing or electromotive force producing function. Nutrients for the living organisms can be included in an electrolyte such as sea water.

When the biological processes are used to perform depolarizing functions, they are involved in secondary molecular reactions with a reactant or a product of the half cell reaction. However, they can also function by directly catalyzing the half cell reaction of the battery electrode.

When the living organisms or their enzymes are employed as catalysts they are placed in itimate contact with the electrode and act as electron transfer agents from the electrode to the reactant of the half cell reaction. For example, when these organisms or enzymes are used to catalyze the cathodic half cell reaction, they receive electrons at the cathode flowing into the battery and transfer these electrons to the reactant being reduced. Conversely, when used to catalyze the anodic half cell reaction, they accept electrons from the reactant being oxidized and transfer these electrons to the anode where they flow out of the battery.

The term "biological organism" as used herein includes any organism produced by natural growth processes which depolarizes or catalyzes an electrode half cell reaction and functions compatibly with the electrolyte in the system. The organisms may perform their function as part of their living cycle, or may create enzymes which perform their function. Some organisms may further contribute to the half cell reaction by utilizing photo energy which adds to the power output of the reaction.

While it is at present preferred that "micro biological organisms" be used because of their ability to obtain more intimate contact with the electrode material without insulating the electrode from the electrolyte, the operative organisms are not necessarily microscopic in size. If the organisms are too large to be useful, extracts made therefrom or enzymes derived therefrom may be used.

The term "non-consumable" as used herein to define electrodes means any base material which is not appreciably consumed under the operating conditions of the battery or electrical energy generator and thus includes some metals which are generally considered corrodible under other conditions.

It is then an object of this invention to provide a power package for creating electrical energy which uses processes of biologically produced organisms.

Another object of this invention is to provide an electrical energy generator using organisms produced by natural growth such as bacteria or algae or enzymes thereof to promote or enhance production of electrical current.

A still further object of this invention is to provide a device for generating electricity by chemical action which uses biological processes for catalyzing or depolarizing electrode reactions.

A still further object of this invention is to provide a primary battery containing organisms which either produce a chemical substance that is used in the electrode reaction in the battery or which consumes a substance that is produced by the electrode reaction.

A still further object of this invention is to provide a primary battery with biological organisms which catalyze electrode reactions to produce electrochemical generation of current.

Another object of the invention is to provide a primary battery with a colony of biological organisms on the anode, the cathode, or both the anode and cathode, selected from classes of organisms which liberate substances needed to maintain electrode reaction in the battery or which consume substances that polarize the electrode reaction in the battery.

Another object of the invention is to provide an electrical generator with biological organisms that utilize photo energy at the cathode, the anode, or both to produce electrical energy.

A specific object of the invention is to provide a primary battery having a cathode with a colony of living organisms thereon adapted to consume hydrogen liberated at the cathode for preventing polarization of the battery action.

A still further object of this invention is to provide a primary battery having the power generating capacity thereof enhanced by living organisms fed from nutrients in the battery electrolyte.

Another specific object of this invention is to provide a battery having a sea water electrolyte and living organisms in the electrolyte enhancing the electrode reaction.

Other and further objects of this invention will be apparent to those skilled in this art from the following descriptions of the annexed sheets of drawings which show several embodiments of the invention.

On the drawings:

FIGURE 7 is a schematic view of a "sea water" battery according to this invention carried on a body movable through a sea water electrolyte, such as a boat, submarine, torpedo, and the like;

As shown on the drawings:

Figure 1:
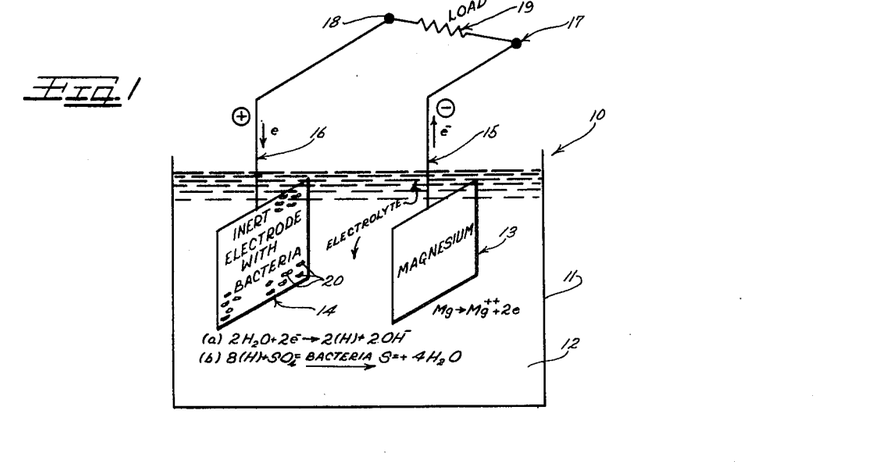
FIGURE 1 is a schematic diagram of a simple battery of the bacterial-hydrogen or consumable anode type according to this invention.

In FIG. 1 the reference numeral 10 designates generally a simple battery of the consummable anode type according to this invention. The battery 10 includes a casing 11 containing an aqueous electrolyte 12 into which are submerged a pair of electrodes 13 and 14 connected through conductors 15 and 16 to terminals 17 and 18 between which a current consuming load 19 is interposed. The electrode 14 is covered with biological organisms 20 which will consume hydrogen or will catalyze a cathode half-cell reaction.

The casing 11 may be composed of any suitable material inert to the contents of the battery. Rubber, synthetic resinous products, wood, concrete, ceramic materials, and non-corroding metals could be used for the casing material.

The electrolyte 12 is any substance capable of transmitting ions between the electrodes 13 and 14 and compatible with the biological organisms 20 exposed to the electrolyte. Suitable electrolytes include aqueous saline solutions or brines, weak acid or alkaline aqueous solutions and the like ionizable or ion conducting substances. A suitable brine is ordinary ocean water which is slightly alkaline and may vary in pH from 7.5 to 8.3 and which contains as major constituents chloride, sulfate, sodium, magnesium, calcium, and potassium ions but, if desired, brines can be made up from fresh water and enough salts such as sodium chloride, potassium chloride, sodium nitrate, and the like, to provide conduction of ions. Suitable acid solutions include dilute aqueous sulfuric acid in strengths which will not impede the functions of the organisms 20. Suitable alkaline solutions will include aqueous sodium hydroxide or ammonium hydroxide likewise in strengths compatible with the organisms.

The electrode 13 is composed of any material of relatively high electromotive force capable of reacting with the electrolyte to give up electrons in accordance with the half cell reactions described hereinabove. Suitable anode materials include metals relatively high in the electromotive force series such as magnesium, aluminum, zinc, and even iron.

The electrode 14 is composed of any suitable cathodic material preferably lower in the electromotive force series than the anode and capable of carrying out a cathodic process in accordance with the half cell reactions described hereinabove. Suitable cathode materials include metals lower in the electromotive force series than the anode on which biological organisms can live or be supported. A suitable metal is iron or steel, although metals such as nickel, tin or platinum could also be used. Further, the cathode could be composed of a non-metal such as carbon.

The conductors 15 and 16 are any suitable electric current conducting materials such as copper, silver, steel or the like.

In accordance with this invention a colony of hydrogen consuming biological organisms 20 is built up or grown on the cathode 14. These organisms in their natural biological process will prevent polarization of the cathode by consuming hydrogen just as soon as it is liberated at the cathode. The metabolic reactions of the biological organisms vary widely from species to species and certain types are capable of "breathing" sulfur compounds instead of oxygen, of "eating" carbon monoxide, hydrogen and the like, instead of the protein molecules demanded by more sophisticated organisms. Suitable organisms for acting as depolarizers in the battery of FIG. 1 include *Desulfovibrio desulfuricans* and *Hydrogenomonas*.

A battery 10 has been built and tested using ordinary sea water as the electrolyte 12, a plate of magnesium metal as the anode 13, a plate of steel as the cathode 14, and a colony of *Desulfovibrio desulfuricans* bacteria 20 on the cathode 14. To produce the bacteria coated cathode 14 a sterile steel strip composed of mild steel (SAE 1020) of about one inch in width, 6 inches in length, and ⅛ inch in thickness was welded at one end to an iron rod. One gallon of sea water was admixed with about 500 parts per million of sodium lactate to assure sufficient nutrient for supporting growth of the bacteria. A live culture of *Desulfovibrio desulfuricans* bacteria was added to the gallon of sea water and the steel strip was immersed in the solution with the welded-on rod projecting from the solution. The assembly was then covered with a lid to seal off the air and was held at about 90° F. for two weeks. Periodically during the two week period the solution was vented to release $H_2S$ formed during the bacterial growth. At the end of the two week period the strip was amply coated with a colony of *Desulfovibrio desulfuricans* bacteria and was ready for use as a cathode 14 in the battery 10 with the iron rod serving as the conductor and suspending member 16.

During operation of the battery utilizing the *Desulfovibrio desulfuricans* bacteria on the cathode 14, it is preferred to immerse the cathode considerably below the level of the electrolyte 12 and to add sodium sulfate from time to time for supplying sulfate ions to act as a nutrient for the bacteria. FIG. 1 of the drawings shows the reactions that occur at the cathode 14 as well as at the anode 13 using the *Desulfovibrio desulfuricans* bacteria on the cathode.

An alternate method of producing a bacteria coated cathode 14 includes dipping of the mild steel strip directly into a standard agar solution of the bacteria, such as for example, the Hydrogenomonas, followed by a drying of the strip for about 20 minutes and an immersion of the strip in sea water. An inert electrode was also inserted in the same sea water bath and an external E.M.F. applied to cause the inoculated steel strip to become cathodic. Current in the amount of about ¹⁄₁₀th ampere per sq. ft. was applied and was gradually raised over a ten day period until about 2 amperes per sq. ft. were applied. The system was kept at a temperature of about 90° F. during the 10-day period and at the end of this treatment the strip was amply coated with a colony of the Hydrogenomonas bacteria. The battery 10 was then constructed in the same way as described above and during operation of this battery the cathode 14 was held near the surface of the electrolyte to have access to the air which is used in the life process of the Hydrogenomonas bacteria.

It has been found when the cathode current density is relatively high (above 1 ampere per sq. ft.) the main mechanism by which the bacteria function is through a depolarizing process by reacting with the hydrogen formed. For the *Desulfovibrio desulfuricans* species of bacteria this depolarization is carried out by the reaction shown in FIG. 1 where the sulfate ion is combined with the hydrogen. For the Hydrogenomonas species, on the other hand, oxygen is consumed in the reaction with the hydrogen.

When the current density is lower (below 1 ampere per sq. ft.) the main mechanism by which the bacteria functions is by direct enzyme-catalyzed half cell reaction. For the *Desulfovibrio desulfuricans* species this reaction involves direct reduction of the sulfate ions to sulfide ions with the bacteria acting as electron transfer agents at the cathode surface. For the Hydrogenomonas species, oxygen in the electrolyte is reduced directly to hydroxyl ions.

Figure 2:
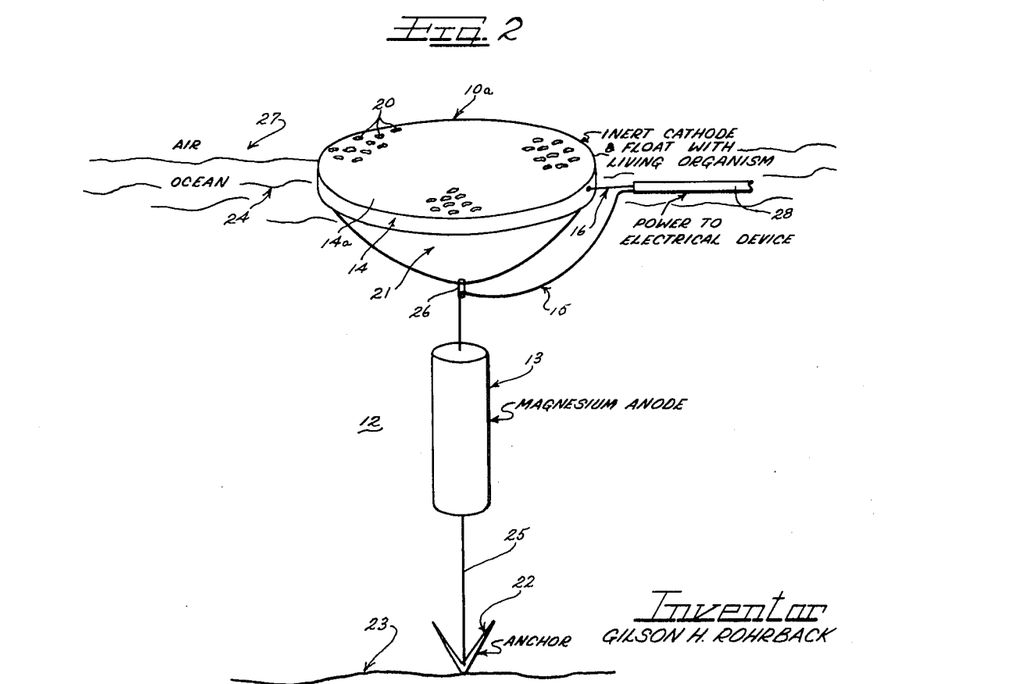
FIGURE 2 is a schematic diagram of a "sea battery" according to this invention illustrating a battery of the type shown in FIG. 1 but using a naturally occurring body of salt water for the electrolyte and source of nutrient.

FIG. 2 illustrates a battery 10a similar to the battery 10 but utilizing a natural occurring body of salt water or brine as the electrolyte. Parts identical with parts described in FIG. 1 have been marked with the same reference numerals.

The battery 10a includes a float 21 composed of any suitable inert floating material or hollow buoyant body and an anchor 22 for securing the battery 10a in relatively fixed position to the floor 23 of the ocean 24 or the like body of naturally occurring electrolyte brine 12. The anchor 22 is connected through a cable 25 with the bottom end of the magnesium anode 13. The top end of the anode 13 has the conductor cable 15 threaded through an eye 26 in the bottom of the float 21 to suspend the anode in substantially vertical position from the float. The cathode 14, composed of steel or any other suitable cathodic material compatible with magnesium as an anode and ocean water as an electrolyte, is mounted on top of the float 21 to have its top face 14a exposed to the ambient air 27 above the level of the ocean 24. The conductor 16 from the cathode 14 can be connected to a heavier cable 28 also receiving the conductor 15 in insulated relation. This top face is covered with a colony of bacteria or algae 20. Bacteria of the Hydrogenomonas species described in FIG. 1 is preferable in this arrangement because the top surface of the cathode is exposed to air. In addition, however, since the top surface is also exposed to sunlight, it is possible to use biological organisms which utilize photosynthesis in their life process. The algae and water mosses appear to be the most useful types of plant life for this purpose. For example, the blue-green algae *Chlorella pyrenoidosa* and the moss *Fontinalis antipyretica* are suitable. These algae and mosses in their natural growth process tend to attach themselves to solid surfaces and growth of these materials can be made on suitable cathode material in a manner such as is described in connection with FIG. 1.

The battery 10a operates in the same manner as the battery 10 but naturally occurring nutrients in the ocean 24 as well as in the ambient air 27 feed the bacteria or algae 20 to maintain their living cycle. The ocean water brine provides the electrolyte 12.

It has been determined that the bacteria and algae will rapidly grow in the sea water electrolyte 12 on any steel surface of the cathode 14 exposed to the sea water and in addition to exerting a strong and specific depolarization action due to the consumption of hydrogen at the cathode, a marked reduction in metal-solution interface resistance occurs promoting higher current carrying capacity per unit area of cathode surface. Thus the interface resistance of clean partially oxidized steel in sea water is of the order of 20 to 50 ohms per square centimeter. Such a resistance can consume a reasonable amount of power which is then not available to do useful work. In contrast, the interface resistance drops by a factor of 10 or more or to 1 to 2 ohms per square centimeter when the growth of a sulfate reducing bacteria becomes established on the metal surface. Thus in a battery of minimum size where resistance of the steel cathode surface could be a limiting factor, this reduction in interface resistance alone could increase the potential capacity by an order of magnitude over that available in the absence of the proper kind of bacterial action at the cathode.

Another further important advantage of the bacteria cathode in the sea water environment is its ability to maintain its efficiency both as to freedom from polarization and freedom from calcareous coatings during prolonged periods of operation. It has been found that calcareous coatings do not easily adhere to the bacteria surface and that a sterile steel cathode shows increasing polarization upon increasing use. Hydroxyl ions are formed in the cathodic process and calcium carbonate and magnesium hydroxide precipitate on the electrode surface to soon coat the electrode with calcareous deposits unless the electrode is first coated with the bacteria or algae. Since the main manner of removal of hydrogen gas at the cathode must be by escape into the surrounding sea, the calcareous deposits markedly increase the concentration of gas bubbles at the electrode and exert a back E.M.F. to increase the polarization. This situation however does not exist with the bacteria cathode and bacteria cathodes operated in sea water for more than four months have been free from calcareous deposits. Even if some calcareous deposits should form on a bacteria cathode according to this invention, their effect on the electrode potential is minimized because hydrogen gas does not form at the bacterial cathode and the physical barriers produced by such a gas are not created. As explained above the bacteria consume nascent hydrogen before it is formed into a gas bubble.

Figure 3:
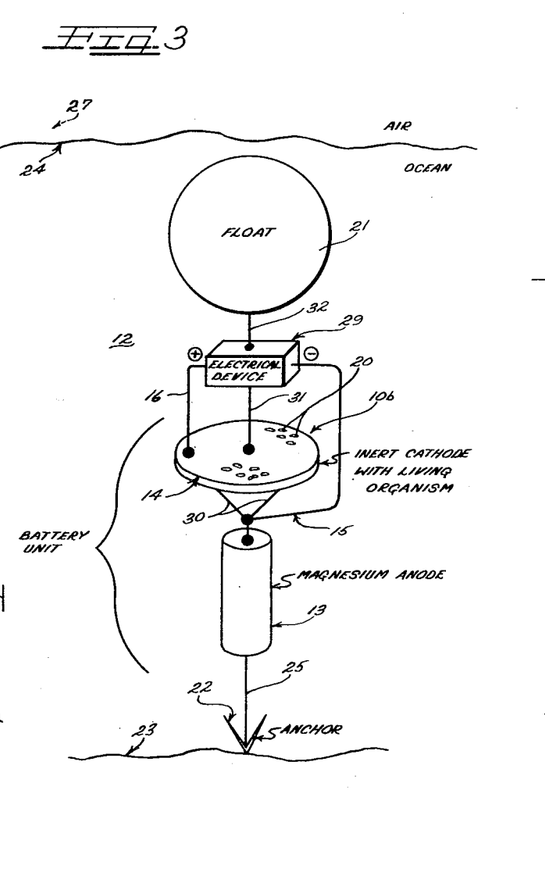
FIGURE 3 is a schematic diagram of another form of "sea battery" according to this invention in which all of the elements are submerged.

In FIG. 3 a battery 10b similar to the battery 10a is disclosed and identical parts have been marked with the same reference numerals used in FIG. 2.

The battery 10b is completely submerged in the ocean 24 and is coupled with a submerged electrical device such as a signal producing unit 29 energized by current produced from the battery 10b.

As shown the conductor 15 from the anode 13 is connected by cables 30 to the cathode 14 coated with the colony of bacteria or algae 20. The cathode 14 in turn is suspended by a cable 31 from the electrical device 29, which electrical device in turn is suspended by a cable 32 from the float 21. The cable lengths are such as to maintain the float 20 beneath the ocean level so as to be completely submerged and thus avoid detection. The conductor 15 from the magnesium anode 13 is connected to the negative pole of the device 29 while the conductor 16 from the cathode 14 is connected to the positive pole of the device.

The battery 10b operates in the same manner as the battery 10a and the colony of bacteria or algae 20 can be selected from a suitable species that will thrive under completely submerged conditions in a sea water environment.

If the submerged depth of the cathode 14 is not too great, photo-sensitive biological organisms may be used since solar energy penetrates to depths of about 500 feet below the surface.

The battery 10b as illustrated can operate a submerged electrical device consuming the current generated by the battery.

Figure 4:
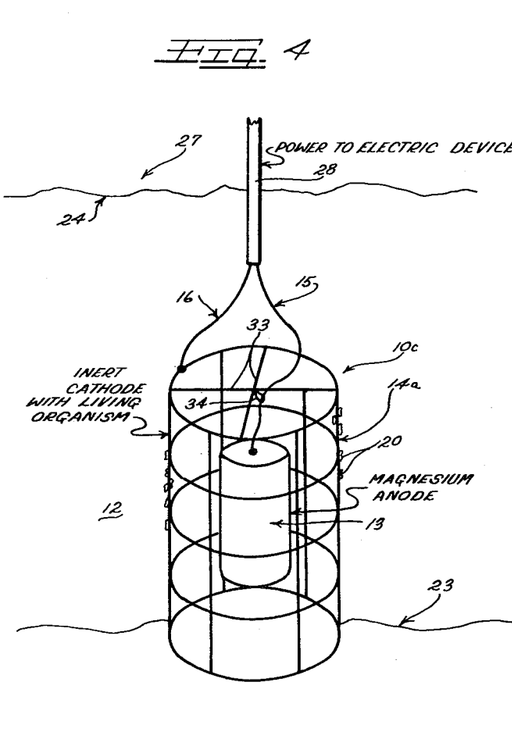
FIGURE 4 is still another schematic diagram of another embodiment of "sea battery" according to this invention wherein the battery elements are on the ocean floor.

The battery 10c of FIG. 4 is also of the consumable anode type and parts identical with parts described in batteries 10, 10a and 10b have been marked with the same reference numerals.

In FIG. 4 the magnesium anode 13 is surrounded by a steel wire cage cathode 14a having the constituent wires thereof covered with the bacteria or algae 20. The electrode cage 14 rests on the ocean floors 23 and the anode 13 is suspended in the center of the cage from cross bars or wires 33 carrying an eye 34 through which the conductor 15 is threaded. The cage electrode 14a of course has the conductor 16 also leading to the main cable 28 in insulated relation with the anode conductor 15. The cage electrode can be anchored to the bottom 23 of the ocean bed or can merely rest on the bottom.

The batteries 10, 10a, 10b and 10c of FIGS. 1 to 4 will produce power continuously until the anodes thereof are consumed. The bacteria can be fed with nutrients introduced into the electrolyte or naturally occurring nutrients in sea water.

To demonstrate the direct catalyzing of the half cell reaction by biological organisms according to this invention a battery 10 as described in FIG. 1 with a cathode covered with a colony of the *Disulfovibrio desulfuricans* bacteria was placed in an autoclave after the magnesium anode 13 has been removed. The battery was heated in the closed autoclave to a temperature of about 400° K. for one hour under the pressure of the closed system of the autoclave. At this temperature all of the living organisms were killed, but because the electrolyte 12 of the battery remained as a liquid under the autoclave pressure, the cellular structure of the colony remained. The battery was then removed from the autoclave, cooled to room temperature, the magnesium anode reimmersed in the electrolyte, and the electrodes coupled to a load. It was found that the dead bacteria or enzymes continued to function as described in connection with FIG. 1. After several hours use of the battery the cathodic activity of the dead bacteria or enzymes decreased probably due to the sloughing off of the organisms.

In accordance with a further embodiment of this invention, batteries can be produced with non-consumed anodes and completely supported by the sea. Thus if the anodic and cathodic half cell reactions involve the same oxidation-reduction process but differ in potential because of differences in concentration of the products of these reactions, then a concentration cell is produced. If a gas is involved in these reactions, the cell or battery can be referred to as a gas concentration cell.

A suitable gas concentration battery operating on an oxygen differential can be, according to this invention, composed of two non-consumable electrodes such as metal or carbon, containing the active bacteria colonies to produce the different potential and cause one electrode to operate as an anode while the other electrode operates as the cathode. In such batteries the process is as follows:

If oxygen were removed as molecular $O_2$, rather than atomic (O), the above process would comprise a gas concentration cell in which oxygen is at two different activities around inert electrodes:

$$O_2(P_1)/ocean/O_2(P_2)$$

Where $P_1$ and $P_2$ are partial pressures of $O_2$ at the surface of the two electrodes. The transfer of one mole of oxygen from $P_1$ to $P_2$ requires 4 Faradays.

Figure 5:
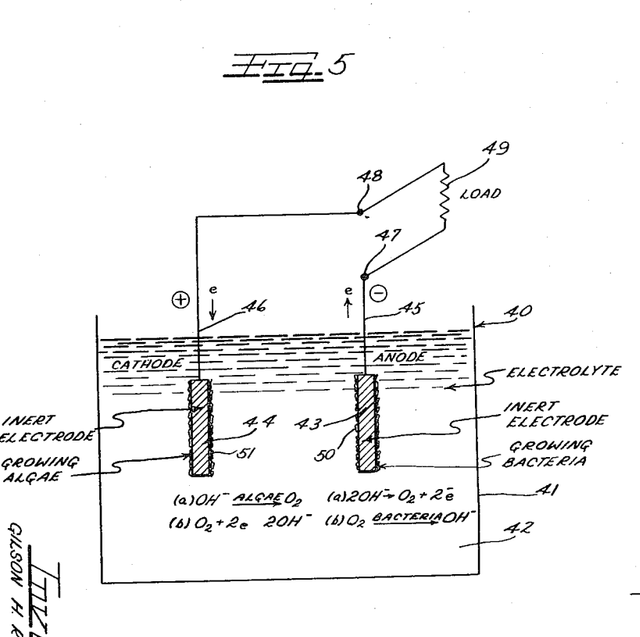
FIGURE 5 is a schematic diagram of a bacterial-oxygen or non-consumable anode type of battery according to this invention.

A suitable bacterial-oxygen battery is schematically illustrated in FIG. 5 where the battery 40 includes a casing 41, an aqueous salt brine electrolyte 42, a carbon anode 43, a carbon cathode 44, a conductor 45 from the anode 43, a conductor 46 from the cathode 44, a negative terminal 47, a positive terminal 48, and a current consuming load 49 connected across the terminals 47 and 48.

The carbon anode 43 is coated with an oxygen consuming species of bacteria such as Pseudomonas in the same manner as described in connection with the battery 10. A covering colony 50 of the bacteria surrounds the carbon anode 43. Several species of these bacteria can be used depending on the chemical substance that is desired to be used in the reaction that consumes the oxygen. For example some species of the bacteria will oxidize sulfides to sulfate, ammonia to nitrates, organic material to carbon dioxide, and the like.

The cathode 44 is infected with an algae colony 51 such as *Chlorella pyrenoidosa* and the moss *Fontinalis antipyretica*. These algae produce oxygen and their growth may be enhanced by exposure to sunlight so that a floating cathode arrangement as described in FIG. 2 could be used to promote the algae growth. The cathode 44 could be placed at the surface of the electrolyte 42 so as to have ready access to oxygen in the air or to an ambient zone of oxygen above the electrolyte.

Inert metals such as stainless steel, gold or platinum can be used in place of the carbon anode 43 and carbon cathode 44.

FIG. 5 indicates the half cell reactions that are involved in the operation of the battery.

While a great number of different algae can be used at the cathode 44, species known as *Chlorella pyrenoidosa* and *Fontinalis antipyretica* are satisfactory.

Any of the arrangements shown in FIGS. 2 to 4 can also be used in the oxygen concentration battery and since the photosynthetic zone extends to depths as much as 500 feet it is not necessary to expose the algae directly to the surface of the ocean for maintaining the life process at the cathode.

Figure 6:
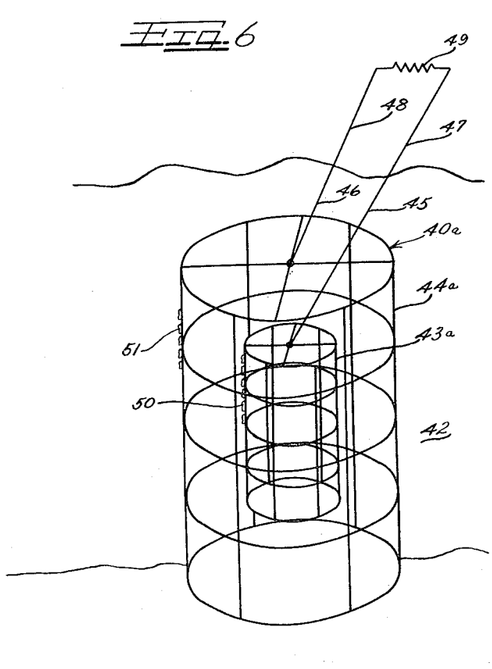
FIGURE 6 is a schematic diagram of a "sea battery" according to this invention illustrating a battery of the type shown in FIG. 5, using a naturally occurring body of salt water as the electrolyte and source of nutrients.

In FIG. 6 the battery 40a uses the naturally occurring sea water as the electrolyte 42, a steel wire cage anode 43a, a surrounding steel wire cage cathode 44a and the conductors 45 and 46 forming the couple through the loading device 49 as in FIG. 5. The anode 43a is covered with oxygen consuming bacteria 50 such as a Pseudomonas species while the cathode 44a is covered with a blue-green chlorophyll containing algae 51. The battery 40a functions in the same manner as the carbon electrode battery 40 and if the cathode 44a is exposed to the ambient air above the sea water level, the algae may not be necessary since the air will furnish the oxygen for producing the cathodic reaction.

Hydrogen concentration cells comparable with the oxygen concentration cells 40 and 40a can be provided but utilizing organisms at the cathode to consume hydrogen and at the anode to actually produce hydrogen especially if the electrolyte is sea water because, unlike oxygen, hydrogen is not naturally occurring. Examples of hydrogen producing bacteria for the anode are *E. coli* and Clostridium. Examples of bacteria which are suitable for and consumption of hydrogen at the cathode in a hydrogen concentration cell battery are *Disulfovibric desulfuricans* and Hydrogenomonas.

Thus, in the hydrogen concentration cell, the inert cathode would be covered with hydrogen consuming bacteria and the inert anode would be covered with hydrogen producing bacteria.

Further, it will be apparent that biological processes can be used to support electrochemical power generation between any two pairs of different electrodes where a biological species can be found to depolarize the half cell reactions. Of special interest in this category are batteries in which hydrogen is supplied by the organisms for use at the anode and either sulfate ions or oxygen supplied by the organisms is utilized at the cathode. Specific examples of two such batteries are:

| | Anode | | Cathode | |
|---|---|---|---|---|
| | Half Cell Reaction* | Biological Function | Half Cell Reaction* | Biological Function |
| 1 | $H_2 \rightarrow H+$ | Clostridium furnishes $H_2$ | $SO_4^- \rightarrow S^-$ | Autotrophic furnishes $SO_4^-$ |
| 2 | $H_2 \rightarrow H+$ | Rhodospirillium rubrum furnishes $H_2$ | $O_2 \rightarrow OH^-$ | Blue Green Algae furnishes $O_2$ |

* Oxidation and reduction species only, not balanced.

Figure 7:
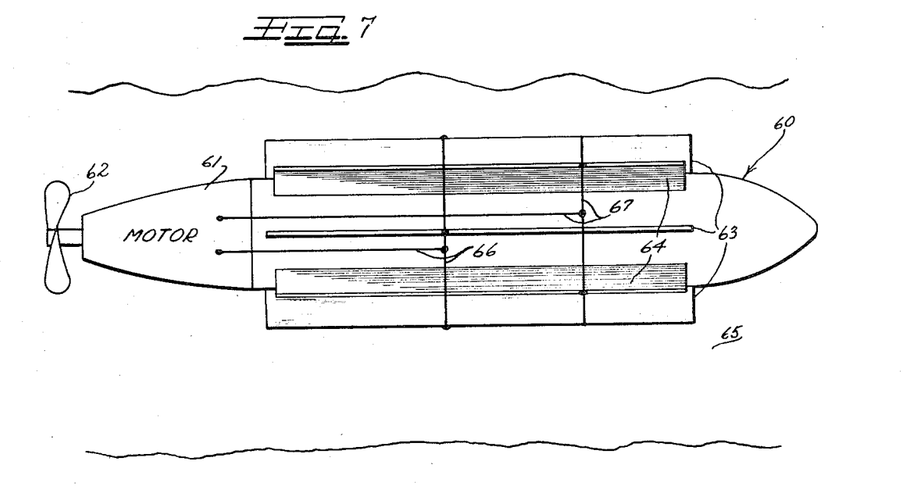

FIG. 7 designates schematically an application of the sea batteries of this invention to a body moving through the sea, such as a torpedo 60. The torpedo has an electric motor 61 driving a propeller 62. The motor 61 is supplied with electrical current from a series of anode fins 63 radiating from the torpedo body 60 into the surrounding sea water 65. These anode fins 63 alternate with cathode fins 64 also projecting into the ambient sea water 65 and conductors 66 and 67 form the couple between the anodes and cathodes with the electric motor load. The anodes 63 can be consumable and the cathodes 64 can be coated with hydrogen consuming bacteria to provide a consuming anode type of battery such as the battery 10 described hereinabove.

Figure 8:
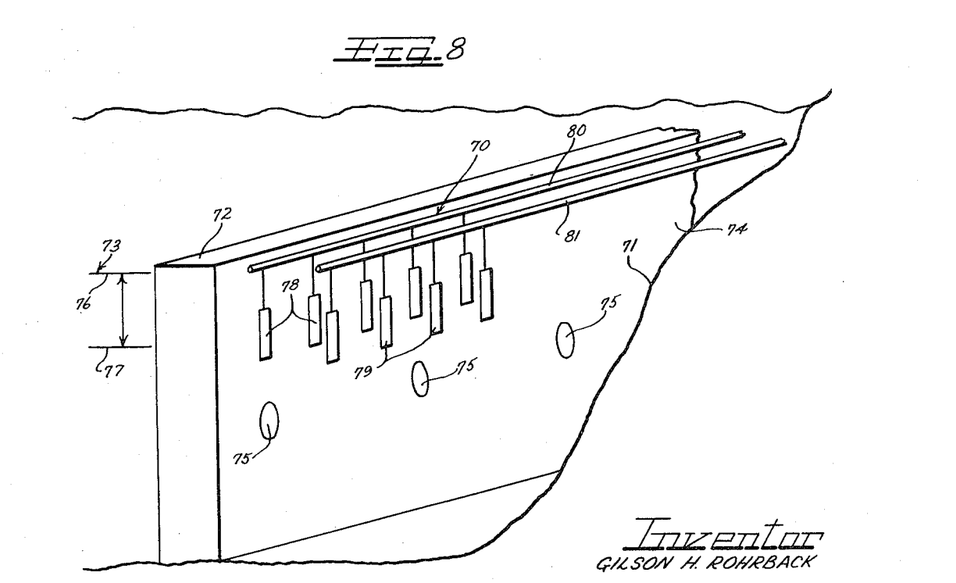
FIGURE 8 is a schematic diagram of a "sea battery" of this invention equipped with a plurality of cathodes and anodes along a naturally occurring ocean front or shore line and behind a sea wall accommodating tidal flow of sea water electrolyte into and out of the electrode compartment.

FIG. 8 designates schematically a sea battery arrangement according to this invention installed along a naturally occurring shore line behind a sea wall. The battery 70 of FIG. 8 is built up along an ocean shore line 71 and a sea wall 72 is provided between the shore line 71 and the main ocean body 73. In the space behind the sea wall 72 and in front of the uprising portion of the shore line 71 a trough 74 is provided and this trough can extend as far as convenient to receive the desired number of anodes and cathodes. The sea wall 72 is provided with openings 75 at levels below the high tide level 76 and also preferably below the low tide level 77 of the ocean 73. A series of anodes 78 are suspended in the sea water electrolyte in the trough 74 adjacent a series of cathodes 79. A conductor 80 joins the anodes 78 and a second conductor 81 joins the cathodes 79. The two conductors are connected to a work load as in FIG. 1 to deliver power thereto. The anodes can be of the consumable type and the cathodes can be coated with hydrogen consuming bacteria to produce batteries of the type shown at 10. Alternately, the cathodes and non-consumable anodes can both be coated with biological organisms to produce either an oxygen or a hydrogen concentration battery or a hydrogen-oxygen or hydrogen-sulfate battery as described.

At high tide 76 ocean water will flow into the trough 74 to replenish the nutrient supply to the organisms coated on the anodes or cathodes or both. Spent electrolytes will automatically wash out of the trough 74 at low tide 77. The electrodes 78 and 79 are preferably at a level in the trough so as to always be below low tide level 77. The conductors 80 and 81 are always above the high tide level 76.

FIG. 8 illustrates a practical application of the principles of this invention to a permanent installation of a sea battery using ocean water as the natural occurring electrolyte and nutrient source for the bacteria and algae.

Figure 9:
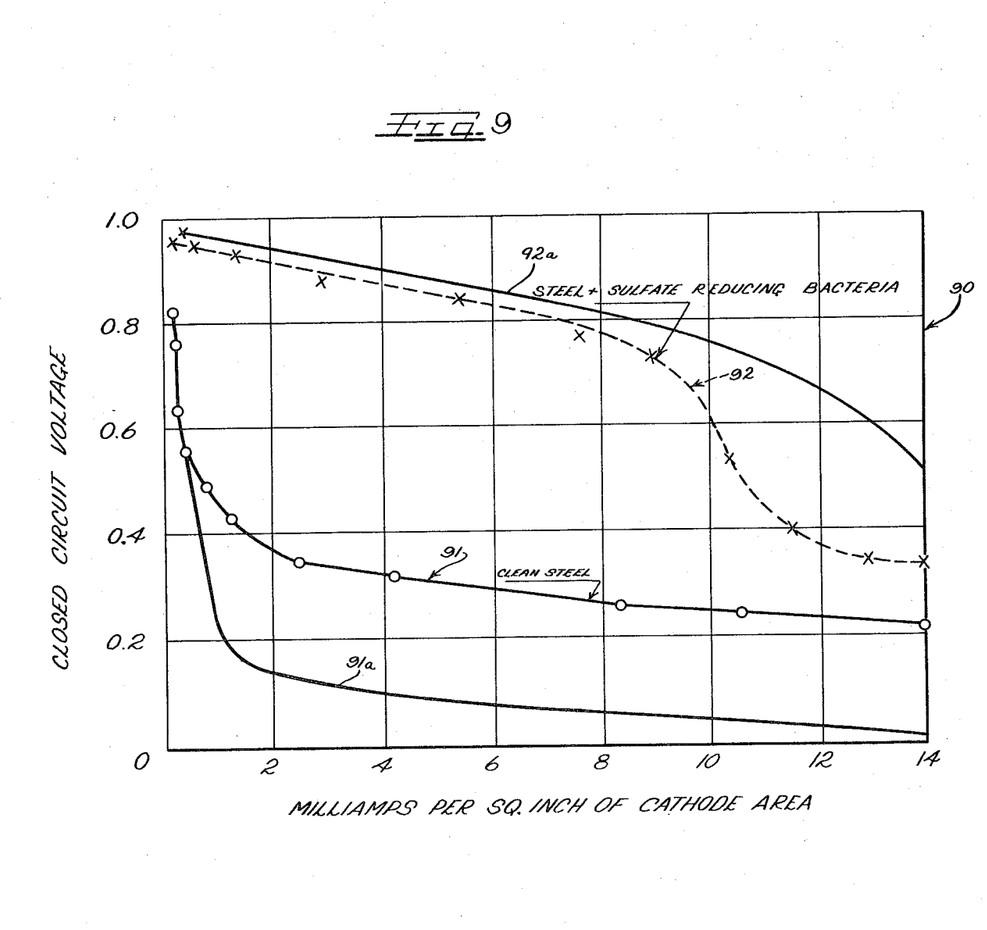
FIGURE 9 is a chart of polarization curves comparing closed circuit voltages in a bacteria infested battery according to this invention with a non-infested identical battery.

The chart 90 of FIG. 9 illustrates the remarkable effect of the biological organisms in promoting the electrode reactions according to this invention. It further specifically demonstrates the advantages of a *Desulfovibro desulfuricans* coated cathode over a sterile cathode of the same material and dimensions. In this chart are shown polarization curves for sterile steel and bacteria infested steel cathodes when connected to a magnesium anode in sea water to produce a battery 10 of FIG. 1. The closed circuit voltage, plotted as abscissa, is the voltage developed by each cell across wherever resistance load was necessary to limit the current density to the values plotted as ordinates. As is shown by the curve 91 for sterile steel, the voltage dropped rapidly at low current becoming relatively constant below 0.3 volt. On the other hand, as shown by the curve 92, the bacteria infested steel cathode maintained a substantially constant voltage within 0.2 volt of its maximum value up to a current density of about 10 milliamperes per sq. in. Above this density the voltage dropped rapidly but throughout the region from 1 milliampere per sq. in. to 8 milliamperes per sq. in. current is available from the bacteria cell at 0.95 to 0.8 volt, as compared to 0.45 to 0.25 volt for the sterile steel cathode.

As illustrated by the curve 91a, the sterile steel cathode equipped battery shows even greater polarization upon prolonged use whereas, as illustrated by the curve 92a, the closed bacteria infested steel cathode battery shows less depolarization with use. The bacteria flourish and become more efficient with use. The curves 91a and 92a represent average behavior, whereas the curves 91 and 92 are plotted from actual test data.

While, as defined above, the invention includes in its scope all biological organisms and preferably all microbiological organisms which catalyze or depolarize the half cell reactions of electrochemical current generation, conveniently useful and efficiently operating subgroups of such organisms include bacteria and algae. The bacteria subgroup is composed of unicellular microscopic organisms of the Schizomycetes class. These cells may occur singularly or in colonies of long chains and filaments. Since bacteria reproduce very rapidly by simple fission, their colonies are easily maintained on the electrodes. The algae subgroup includes the blue-green; the green and yellow-green; the brown; and the red classes and are conveniently useful and efficiently operating in sea water electrolyte environments.

From the above descriptions it therefore will be understood that this invention provides electrical energy generators using biological organisms to create or enhance electrochemical generation of current.

It will be understood that modifications and variations may be effected without departing from the scope of the novel concepts of the present invention.

I claim as my invention:

1. A battery comprising an aqueous brine, a consumable metal anode high in the electromotive force series immersed in the brine, a cathode composed of material lower in the electromotive force series than the anode also immersed in the brine, a colony of hydrogen consuming biological organisms compatible with said brine associated with the cathode to minimize polarization of the battery, and means for conducting usable electric current from the anode and cathode.

2. A sea battery comprising a body of sea water, a consumable metal anode high in the electromotive force series immersed in the sea water, a cathode immersed in the sea water adjacent the anode and composed of material lower in the electromotive force series than the anode, a colony of hydrogen consuming biological organisms compatible with said sea water covering the cathode to minimize polarization of the battery, and means for conducting usable electric current from the anode and cathode.

3. A sea battery which comprises a body of sea water, a magnesium anode immersed in the sea water, a ferrous metal cathode immersed in the sea water adjacent the anode, a colony of micro biological organisms on the cathode, the life processes of which are compatible with sea water and consume hydrogen to minimize polarization of the battery, and means for conducting usable electric current from the anode and cathode.

4. A biological depolarized battery which comprises an electrolyte, an anode immersed in the electrolyte, a nonconsumable cathode immersed in the electrolyte, a depolarizer for the cathode comprising a colony of biological organisms compatible with said electrolyte and function to consume hydrogen liberated at the cathode, and means for conducting usable electric current from the anode and cathode.

5. A battery which comprises an aqueous saline solution, a magnesium anode immersed in said solution, a ferrous metal cathode immersed in said solution, a colony of bacteria selected from the group consisting of *Desulfovibrio desulfuricans* and Hydrogenomonas covering the cathode effective to function as a cathode depolarizer, said saline solution being compatible with said bacteria, a nutrient for said bacteria in said solution, and means for conducting usable electric current from the anode and cathode.

6. An oxygen concentration cell comprising a saline solution, non-consumable electrodes immersed in said solution, a colony of oxygen consuming biological organisms on one of the electrodes, a colony of oxygen producing biological organisms on the other of the electrodes, said colonies on the respective electrodes being compatible with the saline solution and effective to establish and maintain anodic and cathodic reactions between the electrodes for electrochemical generation of current, and means for conducting usable electric current from said electrodes.

7. A hydrogen concentration cell comprising an aqueous saline solution, a pair of non-consumable electrodes immersed in said solution, a colony of hydrogen producing biological organisms on one electrode, a colony of hydrogen consuming biological organisms on the other electrode, said colonies of organisms being compatible with said saline solution and effective to create and respectively maintain anodic and cathodic reactions between the electrodes, and means for conducting usable electric current from said electrodes.

8. An oxygen concentration cell comprising a sea water electrolyte, a first non-consumable electrode immersed in the electrolyte, a colony of oxygen consuming bacteria compatible with said sea water electrolyte on the first electrode selected from the group consisting of Pseudomonads and Autotrophic bacteria, a second non-consumable electrode immersed in the electrolyte, a chlorophyll containing algae growth compatible with said sea water electrolyte on said second electrode effective to produce oxygen by utilization of photo energy, said bacteria and said algae creating and maintaining an anodic reaction at the first electrode and a cathodic reaction at the second electrode, and means for conducting usable current from said electrodes.

9. A hydrogen concentration cell which comprises a sea water electrolyte, a first inert electrode immersed in said electrolyte, a colony of hydrogen consuming bacteria compatible with said sea water electrolyte covering said first electrode and selected from the group consisting of *Desulfovibrio desulfuricans* and Hydrogenomonas, a second inert electrode immersed in said electrolyte, a colony of hydrogen producing bacteria compatible with said sea water electrolyte selected from the group consisting of *E. coli* and Clostridium covering the second electrode, said bacteria being effective to create and maintain a cathodic reaction at the first electrode and an anodic reaction at the second electrode, and means for conducting usable current from said electrodes.

10. A sea battery which comprises a float buoyant in sea water, a non-consumable cathode carried by said float, an anode suspended from said float, an anchor holding the anode in submerged position in a sea water medium, and a colony of hydrogen consuming micro-biological organisms on the cathode and compatible with sea water.

11. In combination with a hull movable through sea water, a plurality of non-consumable cathodes projecting from the hull into sea water supporting the hull, a plurality of non-consumable anodes projecting from the hull alternating with the cathodes to provide ion paths between the anodes and cathodes, and said cathodes having colonies of sea water compatible biological organisms coated thereon effective to maintain cathodic reactions and prevent polarization of the cathodes.

12. The method of depolarizing batteries which comprises contacting the battery cathode with biological organisms which consume substances liberated in battery action that produce a back electromotive force.

13. An electrical energy generator comprising:
an ion transmitting substance,
electrodes including at least one non-consumable electrode immersed in said substance,
biological organisms compatible with said substance in contact with both said substance and said non-consumable electrode and having a life process effective to promote electrochemical generation of current between the electrodes,
at least one substance convertible into a different oxidation state by said organisms in contact with the organisms,
and means for conducting usable electric current from said electrodes.

14. A device capable of generating useful electrical energy which comprises:
an electrolyte,
electrodes including at least one non-consumable electrode immersed in said electrolyte,
biological organisms compatible with said electrolyte in contact with both said electrolyte and said non-consumable electrode at the site of said non-consumable electrode and having a life process effective to promote electrochemical generation of current between the electrodes,
at least one substance convertible into a different oxidation state by said organisms in contact with said organisms and non-consumable electrode,
and means for conducting usable electric current from said electrodes.

15. A device capable of generating useful electrical current comprising:
an aqueous electrolyte,
electrodes including at least one non-consumable electrode immersed in said electrolyte,
a colony of microbiological organisms compatible with said electrolyte covering said non-consumable electrode and having a life process effective to promote electrochemical generation of current between the electrodes,
at least one substance convertible into a different oxidation state by said organisms in contact with the organisms,
and means for conducting usable electric current from said electrodes.

16. A battery comprising:
an electrolyte,
an anode immersed in the electrolyte,
a non-consumable cathode immersed in the electrolyte,
a colony of hydrogen consuming biological organisms compatible with said electrolyte on said cathode and exposed to said electrolyte,
at least one substance convertible into a different oxidation state by said organisms in contact with the organisms and cathode,
and means for conducting usable electric current from said anode and cathode.

17. A device capable of generating useful electrical current which comprises:
an electrolyte,
a pair of non-consumable electrodes immersed in the electrolyte,
biological organisms compatible with said electrolyte on one electrode furnishing through their life process substances which cause an anodic reaction,
at least one substance convertible to a lower oxidation state by said organisms at the anode in contact with said organisms and anode,
biological organisms compatible with said electrolyte on the other electrode furnishing through their life process substances which cause a cathodic reaction,
at least one substance convertible into a higher oxidation state by said organisms at the cathode in contact with said organisms and the cathode,
and means for conducting usable current from the electrodes.

18. A device capable of generating useful electrical current which comprises:
an electrolyte,
electrodes, including a non-consumable electrode, immersed in the electrolyte and coating therewith to generate half cell reactions to produce electrical current,
biological organisms compatible with said electrolyte in contact with said electrolyte and said non-consumable electrode and effective to promote a half cell reaction,
at least one substance convertible into a different oxidation state by said organisms,
and means for conducting usable current from said electrodes.

19. A hydrogen-oxygen battery capable of delivering useful electrical current which comprises:
an electrolyte,
a non-consumable anode immersed in said electrolyte,
a non-consumable cathode immersed in said electrolyte,
a colony of hydrogen producing biological organisms compatible with said electrolyte on said anode,
a substance convertible to hydrogen by the action of said organisms in contact with said hydrogen producing organisms and said anode,
a colony of oxygen producing biological organisms compatible with said electrode on said cathode,
a substance convertible to oxygen by the action of said oxygen producing organisms in contact with said oxygen producing organisms and said cathode,
said colonies or organisms being effective to create and maintain cathodic and anodic reactions between the electrodes,
and means for conducting usuable current from said electrodes.

20. A device capable of generating useful electrical current which comprises:
an electrolyte,
electrodes including a non-consumable electrode immersed in the electrolyte,
a colony of photo energy consuming biological organisms compatible with said electrolyte on a non-consumable electrode and effective to catalyze a half cell reaction at the non-consumable electrode, at least one substance convertible to a different oxidation state by the action of the photo energy consuming organisms, and means for conducting usable current from said electrodes.

21. In combination with a body movable through sea water,
a plurality of electrodes including non-consumable electrodes projecting from said body into the sea water supporting the body,
conductors coupling alternate electrodes together to form a pair of battery poles including a non-consumable battery pole,
and said non-consumable electrodes having colonies of sea water compatible biological organisms thereon effective to catalyze battery half cell reactions for generating electrical current at said poles.

22. A torpedo or the like body movable through sea water which comprises:
a casing,
anode fins radiating from said casing to project into sea water supporting said body,
non-consumable cathode fins radiating from said casing to project into the sea water supporting the body,
means electrically connecting the fins to form positive and negative battery poles,
and sea water compatible biological organisms covering said non-consumable cathode fins and effective to create and maintain cathodic reactions at said cathode fins.

23. The method of generating useful electrical current which comprises:
effecting electrode reactions in an electrolyte with the biological processes of organisms that are compatible with the electrolyte,
and supplying to said organisms material convertible into a different oxidation state by said organisms.

24. The method of producing electrical power which comprises:
effecting half cell reactions at electrodes in a battery with biological organisms having a life process effective to promote electrochemical generation of current,
and supplying at least one substance convertible into a different oxidation state by said organisms into contact with said organisms and electrodes.

25. The method of generating electrical current which comprises:
immersing an anode and a cathode in an electrolyte,
maintaining biological organisms on the anode and cathode which are compatible with the electrolyte and respectively promote the anodic and cathodic half cell reactions of a battery,
supplying to said organisms material convertible into a different oxidation state by said organisms, and conducting usable electric current from said anode and cathode.

26. The method of generating electrical current which comprises:
immersing electrodes, including a non-consumable electrode in an electrolyte,
covering a non-consumable electrode with a photosensitive biological organism compatible with the electrolyte and effective to promote a half cell reaction,
contacting the organism and non-consumable electrode with at least one substance convertible to a different oxidation state by the action of said organism,
and exposing said bacteria covered electrode to light.

27. A bio-electrode adapted to produce usable electric current in combination with another electrode when immersed in an electrolyte which comprises a non-consumable electrical current conductor base,
and biologically produced organisms compatible with said electrolyte and effective to promote a half cell reaction.

28. A bio-electrode adapted for producing usable electric current when immersed in an electrolyte containing a second electrode which comprises:
a non-consumable electric current conducting base, and
a colony of photosensitive biological organisms on said base compatible therewith and with said electrolyte and effective to promote a half cell reaction.

References Cited by the Examiner

UNITED STATES PATENTS

| | | | |
|---|---|---|---|
| 329,724 | 11/1885 | Dieckmann | 136—85 |
| 2,497,852 | 2/1950 | Arnstein | 136—91 |

OTHER REFERENCES

Evans: Metallic Corrosion Passivity and Protection, pp. 300–311, December 1948.

Textbook of Bacteriology by Jordan and Burrows, 14th Edition, 1946, page 13.

Transactions of the Electrochemical Society, vol. LXXVI, 1939, pp. 199–214.

WINSTON A. DOUGLAS, *Primary Examiner.*

JOHN R. SPECK, JOSEPH REBOLD, *Examiners.*